(12) United States Patent
Ruf

(10) Patent No.: US 12,013,242 B2
(45) Date of Patent: Jun. 18, 2024

(54) METHOD FOR READING DATA FROM INERTIAL SENSORS

(71) Applicant: Northrop Grumman Litef GmbH, Freiburg (DE)

(72) Inventor: Markus Ruf, Waldkirch (DE)

(73) Assignee: NORTHROP GRUMMAN LITEF GMBH, Freiburg (DE)

(*) Notice: Subject to any disclaimer, the term of this patent is extended or adjusted under 35 U.S.C. 154(b) by 408 days.

(21) Appl. No.: 17/421,892

(22) PCT Filed: Dec. 3, 2019

(86) PCT No.: PCT/EP2019/083456
§ 371 (c)(1),
(2) Date: Jul. 9, 2021

(87) PCT Pub. No.: WO2020/143959
PCT Pub. Date: Jul. 16, 2020

(65) Prior Publication Data
US 2022/0120567 A1    Apr. 21, 2022

(30) Foreign Application Priority Data
Jan. 10, 2019   (DE) .................... 102019100507.8

(51) Int. Cl.
*G01C 21/16* (2006.01)
*G06F 18/2113* (2023.01)
(52) U.S. Cl.
CPC .......... *G01C 21/16* (2013.01); *G06F 18/2113* (2023.01)

(58) Field of Classification Search
CPC ...... G01P 15/00; G01P 15/0888; G01P 15/18; G06F 17/10; G06F 18/2113; G01C 21/16
USPC ....................................... 73/514.01
See application file for complete search history.

(56) References Cited

U.S. PATENT DOCUMENTS

| 7,130,764 | B2* | 10/2006 | Mugler | G06F 17/10 |
| | | | | 702/182 |
| 9,356,607 | B2* | 5/2016 | Spahlinger | G05B 5/01 |
| 11,067,596 | B2* | 7/2021 | Cai | G01P 15/00 |
| 11,133,815 | B2* | 9/2021 | Kobayashi | G01C 9/06 |

(Continued)

FOREIGN PATENT DOCUMENTS

| DE | 102013103274 A1 | 10/2014 |
| DE | 102013020954 A1 | 6/2015 |

*Primary Examiner* — Nathaniel T Woodward
(74) *Attorney, Agent, or Firm* — TAROLLI, SUNDHEIM, COVELL & TUMMINO L.L.P.

(57) ABSTRACT

A method for reading data from sensors is disclosed comprising: determining a sequence of measured data over time by means of a sensor, wherein the sequence of measured data over time is generated by step-by-step changes in the measured data at input times, which are determined by an input frequency fa and have a time interval of a period 1/fa of the input frequency; reading output data from the sensor at read times, which are determined by a read frequency fs and have a time interval of a period 1/fs of the read frequency, where the read frequency fs is smaller than the input frequency fa; determining, by means of a low-pass filter of the sensor, the ratio N between the input frequency fa and the read frequency fs from the sequence over time of the numbers of input times lying between two adjacent read times.

11 Claims, 4 Drawing Sheets

(56) References Cited

U.S. PATENT DOCUMENTS

| | | | |
|---|---|---|---|
| 2015/0196213 A1* | 7/2015 | Pandia | A61B 5/7278 600/509 |
| 2015/0211857 A1* | 7/2015 | Ruf | G01C 19/56 73/504.12 |
| 2019/0331708 A1* | 10/2019 | Kobayashi | G01C 19/5776 |

* cited by examiner

METHOD FOR READING DATA FROM INERTIAL SENSORS

RELATED APPLICATIONS

The present invention is a U.S. National Stage under 35 USC 371 patent application, claiming priority to Serial No. PCT/EP2019/083456, filed on 3 Dec. 2019; which claims priority of DE 102019100507.8, filed on 10 Jan. 2019, the entirety of both of which are incorporated herein by reference.

The present invention relates to a method for reading data from sensors, in particular, from inertial sensors, and sensors which are suitable for carrying out the method.

In inertial sensors (Inertial Measurement Units, IMU) such as rotation rate sensors or acceleration sensors, partial increments are accumulated with an internal data path cycle of the frequency $f_a$. This means that a sequence of measured data is generated in such a manner that changes in the measured data are generated or recorded at intervals of the period duration $1/f_a$ of the internal data path cycle. Therefore, this change takes place step by step or incrementally at read-in times of the data which is specified by the read-in frequency or the data path cycle $f_a$.

In the case of rotation rate sensors, for example, the partial angle increments belonging to the particular data path cycle are continuously accumulated, while, in the case of accelerometers, the partial speed increments belonging to the particular data path cycle are accumulated.

With each query cycle of a read-out frequency $f_s$, the current status of this accumulator is read and then reset to 0 for the next integration interval. The status of the read accumulator represents the total increment in the particular query cycle or the read-out measured data.

A user of such sensors, such as an inertial navigation system, expects that the read-out measured data, i.e. the total increment in the particular query cycle, corresponds exactly to the integration of the generated change in the measured data over the query cycle. The readable data is, however, formed by accumulation over an integer number of data path cycles, which is not equal to the query cycle. For this reason, the data read at a read-out time generally does not fully represent the movement that has actually occurred up to that point in time.

In addition, if an integer number of data path cycles should correspond exactly to the query cycle, an exact synchronization of both cycles would have to be guaranteed, since otherwise smallest frequency deviations will lead to beat effects in the number of accumulations.

One possible solution to the problem described above is described in DE 10 2013 020 954, which is intended to be part of the present application for reference purposes.

This patent, however, requires knowledge of the read-out frequency $f_s$ of the query cycle on the part of the sensor (master mode). This is, e.g., given in the case of an IMU which generates the query cycle for its sensors itself. In general, however, the frequency $f_s$ of the query cycle is not known to a sensor, but is specified externally by an external system (slave mode). In this case, the method described in DE 10 2013 020 954 cannot be used.

The present invention relates to the problem of making methods available for sensors operating in slave mode, which make it possible to adjust data read at a read-out time to the movement that has actually occurred up to that point in time. This problem is solved by the subject matter of the independent claims.

A method for reading data from inertial sensors can, for example, comprise: determining a time sequence of measured data by means of a sensor, where the time sequence of measured data is generated by step-by-step changes in the measured data at read-in times which are determined by a read-in frequency $f_a$ and have a time interval of a period duration $1/f_a$ of the read-in frequency; reading output data from the sensor at read-out times which are determined by a read-out frequency $f_s$ and have a time interval of a period duration $1/f_s$ of the read-out frequency, where the read-out frequency $f_s$ is smaller than the read-in frequency $f_a$ and the period duration of the read-out frequency $1/f_s$ is generally not a multiple of the period duration of the read-in frequency $1/f_a$; determining, by means of a low-pass filter of the sensor, the ratio N between the read-in frequency $f_a$ and the read-out frequency $f_s$ from the time sequence of the numbers of the read-in times lying between two adjacent read-out times. In this process, the output data to be read at the read-out times is generated in the sensor by extrapolation of elements of the time sequence of measured data generated before the particular read-out times based on the ratio N between the read-in frequency $f_a$ and the read-out frequency $f_s$.

The starting point of the method is therefore the situation in which data is generated at a read-in frequency, but are read at a lower read-out frequency that differs therefrom. The sensor generating the data, in particular, an inertial sensor such as a rotation rate or acceleration sensor, only has knowledge of the read-in frequency, but no knowledge of the read-out frequency. This is given by external devices that access the sensor.

However, the sensor is able to count the data path cycles that lie between two read-out cycles (here and in the following, the specification "between" times a and b shall include time b, but not time a). For each read-out interval of the period length $1/f_s$, the sensor can therefore determine the number of read-in times. The ratio N of read-in frequency $f_a$ and read-out frequency $f_s$ can then, by means of a low-pass filter, be concluded from the sequence of these "numbers of read-in times" as the numbers of read-in times oscillate around the value N of this ratio.

The knowledge of the read-in frequency $f_a$ and of the ratio N is equivalent to the knowledge of the two frequencies $f_a$ and $f_s$. The sensor is therefore able to derive all necessary information, despite ignorance of the read-out frequency $f_s$, which is necessary for extrapolating the measured data available up to the last read-in time before a read-out time to the read-out time.

This enables the data read at a read-out time to be adjusted to the movement that has actually occurred up to that point in time, even in slave mode.

The present invention shall now be described by way of example with reference to the accompanying figures. The present invention is, however, not defined by this exemplary description, but solely by the subject matter of the claims.

To illustrate and better understand the present invention, the case described in DE 10 2013 020 954 shall first be discussed again, in which both the read-in frequency $f_a$ and the read-out frequency $f_s$ are known to an inertial sensor. Following this, the present invention will then be discussed, in which a sensor does not specify the read-out frequency itself and therefore does not know it.

First, the problems that occur when data from the inertial sensor (or from an equivalently functioning other sensor such as a temperature sensor or pressure sensor) are read in and out at different frequencies shall be illustrated again using a simple example.

Figure 1:
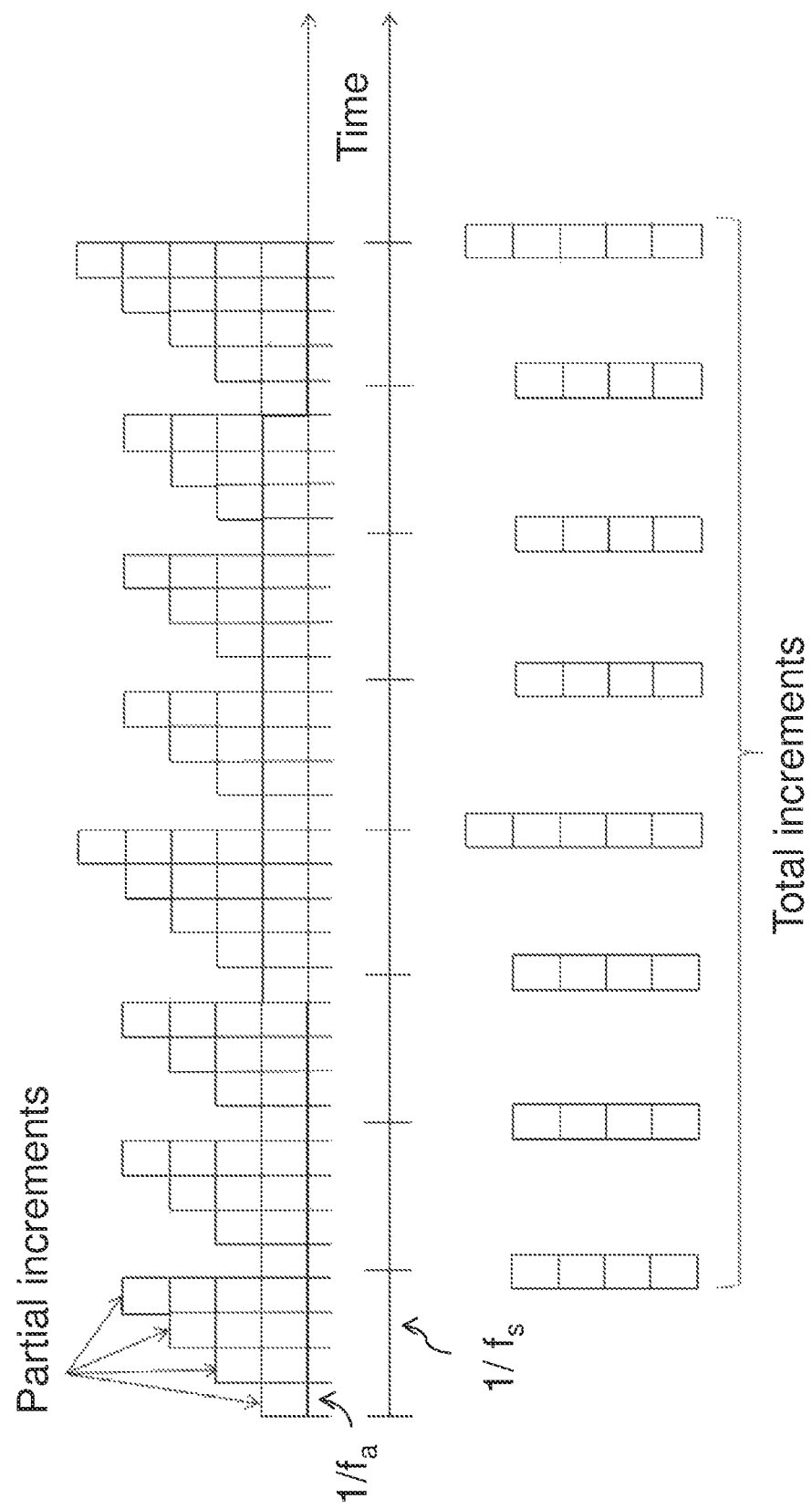
FIG. 1 shows a schematic diagram to illustrate the integral and the differential error criterion.

In the example, a constant, step-by-step change in the measured data is assumed in each data path cycle. The data path cycle or read-in frequency should be $f_a$=3.4 kHz, the query cycle or read-out frequency $f_s$=800 Hz. A query cycle therefore consists of $N=f_a/f_s$=4.25 data path cycles. Since it is only possible to accumulate over a whole number of data path cycles, the data changes accumulated in 4 data path clocks are recorded three times and the data changes accumulated in 5 cycles are recorded once at the read-out times. This pattern repeats itself periodically as shown in FIG. 1.

It applies to the ratio $N=f_a/f_s$ in general that it can also be written as the sum of a natural number n and a fully reduced fraction:

$N=f_a/f_s=n+p/q$, with $n$, $p$, $q$ being natural numbers and $p<q$.

Changes from n to (n+1) read-in times between two read-out times then occur with a period of q read-out cycles. In this process, (q−p) times n read-in times and p times (n+1) occur. The number of changes is maximized in this process.

The errors that occur due to the difference between read-in frequency and read-out frequency can be divided into integral errors and differential errors.

The so-called integral error criterion is used to assess how well the partial increments or changes in measured data accumulated in the read-in times before the individual read-out times are recorded in the total increments or output data output at the particular read-out times. This criterion, which is particularly important in navigation systems, is met in the above method, since each partial increment is also taken into account in a total increment at some point.

The so-called differential error criterion, on the other hand, assesses how well a total increment corresponds to the integration over the query cycle, i.e. how well the measured data output at the read-out times can reflect the movements actually present at the particular read-out times. This criterion is only inadequately met due to the approximation of a query cycle by an integer number of accumulations. The constant change in the number of accumulations is interpreted in the higher-level system as additional measured value noise.

Ideally, the information contained in the total increments or read-out data over time should be adjusted in such a manner that the data output at the read-out times both improves the differential error criterion and meets the integral criterion.

This can be achieved by extrapolation of the measured data that has already been accumulated with the data path cycle before the various read-out times if both the read-in frequency $f_a$ and the read-out frequency $f_s$ are known. Two possible examples of such an extrapolation are discussed in the following text. In the first example, the extrapolation is based on the data accumulated up to the current read-out time and the data accumulated up to the previous read-out time (no delay). In the second case, an additional earlier data accumulation is additionally taken into account, as a result of which the data output is delayed by one read-out cycle (with delay).

Example I: Without Delay

In this case, the output data is generated according to the following formula, with k numbering the read-out times, i.e. k increases by one after each period $1/f_s$ of the read-out cycle:

$$v(k) = v_1(k) \cdot \frac{t_{1r}(k)}{t_1(k)} + v_0(k) \cdot \frac{t_A - t_{1r}(k)}{t_0(k)} - v_r(k) = $$
$$v_1(k) \cdot \frac{f_a \cdot t_{1r}(k)}{n_1(k)} + v_0(k) \cdot \frac{N - f_a \cdot t_{1r}(k)}{n_0(k)} - v_r(k),$$

wherein the following applies:

$t_A=1/f_s$; $t_0(k)=n_0(k)/f_a$; $t_1(k)=n_1(k)/f_a$; $N=f_a/f_s$;

Initial Conditions:

$n_0(0)=n_1(0)=N$; $t_{1r}(0)=v_1(0)=v_r(0)=0$;

State Transitions:

$n_1(k+1)=n_0(k)$; $v_1(k+1)=v_0(k)$.

The iteration of the variables $v_r(k)$ and $t_{r1}(k)$ depends on the following case discrimination:

Case 1: for $N>f_a \cdot t_{1r}(k)+n_0(k)$:

$v_r(k+1)=v_0(k)/n_0(k) \cdot (N-f_a \cdot t_{1r}(k)-n_0(k))$; and $t_{1r}(k+1)=0$.

Case 2: for $N \leq f_a \cdot t_{1r}(k)+n_0(k)$:

$v_r(k+1)=0$; and $t_{1r}(k+1)=1/f_a \cdot (n_0(k)+f_a \cdot t_{1r}(k)-N)$.

In this process, v(k) corresponds to the output data which are read at the $k^{th}$ read-out time $n_0(k)$ corresponds to the number of read-in times positioned between the $(k-1)^{st}$ read-out time and the $k^{th}$ read-out time and $t_0(k)$ to the associated time interval $n_1(k)$ corresponds to the number of read-in times positioned between the $(k-2)^{nd}$ read-out time and the $(k-1)^{st}$ read-out time and $t_1(k)$ to the associated time interval $v_0(k)$ corresponds to the sum of step-by-step changes in the movement data that have taken place at the read-in times that were positioned between the $(k-1)^{st}$ read-out time and the $k^{th}$ read-out time $v_1(k)$ corresponds to the sum of step-by-step changes in the movement data that have taken place at the read-in times that were positioned between the $(k-2)^{nd}$ read-out time and the $(k-1)^{st}$ read-out time $t_{1r}$ corresponds to a time interval $v_r$ corresponds to a residual term.

Example II: With Delay

In this example, the formula to be used for the output data differs in two cases:

Case 1: $N > f_a \cdot (t_{2r}(k) + t_{1r}(k))$:

$$v(k) = v_2(k) \cdot \frac{t_{2r}(k)}{t_2(k)} + v_1(k) \cdot \frac{t_{1r}(k)}{t_1(k)} + v_o(k) \cdot \frac{t_A - t_{1r}(k) - t_{2r}(k)}{t_0(k)} =$$
$$v_2(k) \cdot \frac{f_a \cdot t_{2r}(k)}{n_2(k)} + v_1(k) \cdot \frac{f_a \cdot t_{1r}(k)}{n_1(k)} + v_0(k) \cdot \frac{N - f_a \cdot (t_{1r}(k) + t_{2r}(k))}{n_0(k)}.$$

$t_{1r}(k+1) = 1/f_a(n_o(k) - N + f_a \cdot (t_{2r}(k) + t_{1r}(k)))$.

$t_{2r}(k+1) = 0$;

Case 2: $N \leq f_a \cdot (t_{2r}(k) + t_{1r}(k))$:

$$v(k) = v_2(k) \cdot \frac{t_{2r}(k)}{t_2(k)} + v_1(k) \cdot \frac{t_A - t_{2r}(k)}{t_1(k)} =$$
$$v_2(k) \cdot \frac{f_a \cdot t_{2r}(k)}{n_2(k)} + v_1(k) \cdot \frac{N - f_a \cdot t_{2r}(k)}{n_1(k)}.$$

$t_{1r}(k+1) = n_o(k)/f_a$;

$t_{2r}(k+1) = t_{2r}(k) + t_{1r}(k) - N/f_a$.

wherein the following applies:

$t_A = 1/f_s$; $t_0(k) = n_0(k)/f_a$; $t_1(k) = n_1(k)/f_a$; $t_2(k) = n_2(k)/f_a$; $N = f_a/f_s$;

Initial Conditions:

$n_0(0) = n_1(0) = n_2(0) = N$; $t_{1r}(0) = 1/f_s$; $t_{2r}(0) = 0$;
$v_1(0) = v_2(0) = 0$;

State Transitions:

$n_1(k+1) = n_0(k)$; $n_2(k+1) = n_1(k)$; $v_1(k+1) = v_0(k)$; $v_2(k+1) = v_1(k)$.

Symbols common to both Examples I and II retain their meaning described in Example I. Analogously, the following applies to the new symbols added in Example II:

$n_2(k)$ is the number of read-in times positioned between the $(k-3)^{rd}$ read-out time and the $(k-2)^{nd}$ read-out time and $t_2(k)$ is the associated time interval $v_2(k)$ is the sum of step-by-step changes in the movement data that have taken place at the read-in times that were positioned between the $(k-3)^{rd}$ read-out time and the $(k-2)^{nd}$ read-out time;

$t_{1r}$ is a time interval.

In both Examples I and II, the retention of the integral error criterion is guaranteed when using the above formula, since all data read-in are taken into account in the course of the data output. This can be verified in Example I by considering the variable $$v_{error}(k) = \sum_{i=0}^{k} (v_0(i) - v(i))$$

and in Example II by considering the variable $$v_{error}(k) = \sum_{i=0}^{k} (v_0(i) - v(i+1))$$

which reflects the accumulated difference between filter input and filter output of the inertial sensor. For the fulfillment of the integral error criterion, no drift of the value $v_{error}$ in the positive or negative direction may occur even over arbitrarily large periods of time, it must rather always move around a constant component. That this is the case for the above formula can easily be shown by appropriate simulations.

In addition, it is also easy to show through simulation that the output data can be set very quickly to a value with which the differential error criterion is also met. If one, e.g., takes N=4.25 as a basis and calculates with a constant change in the movement data by 1, then the following applies: $n_0(k)=4$: $v_o(k)=4$, and $n_0(k)=5$: $v_o(k)=5$. In addition, the following applies according to the considerations made above: $n_0$(4i+1)=$n_0$(4i+2)=$n_0$(4i+3)=4; $n_0$(4i+4)=5 (i from the natural numbers with zero). Using the above formula, it can be seen that v(k) quickly adjusts to 4.25, i.e. that the differential error criterion is met. Similar results can also be simulated for more complex examples.

It is evident from the above examples that, for the extrapolation of the measured data changes or increments read in with the data path cycle, the read-in frequency $f_a$ and the read-out frequency $f_s$ or the ratio N of these two variables must be known. This applies not only to the examples explicitly discussed above, but in general, since, without knowledge of the temporal position of the read-out times, it is not possible to generate the output data from the read-in data by extrapolation to these read-out times.

The present invention therefore relates to the problem of how the ratio N can be determined in order to be able to meet both error criteria in slave mode. Although the following description of the invention refers to the examples of data extrapolation explained above, the invention is also applicable to any other, arbitrary extrapolation method that is based on the ratio N of read-in frequency and read-out frequency.

Figure 2:
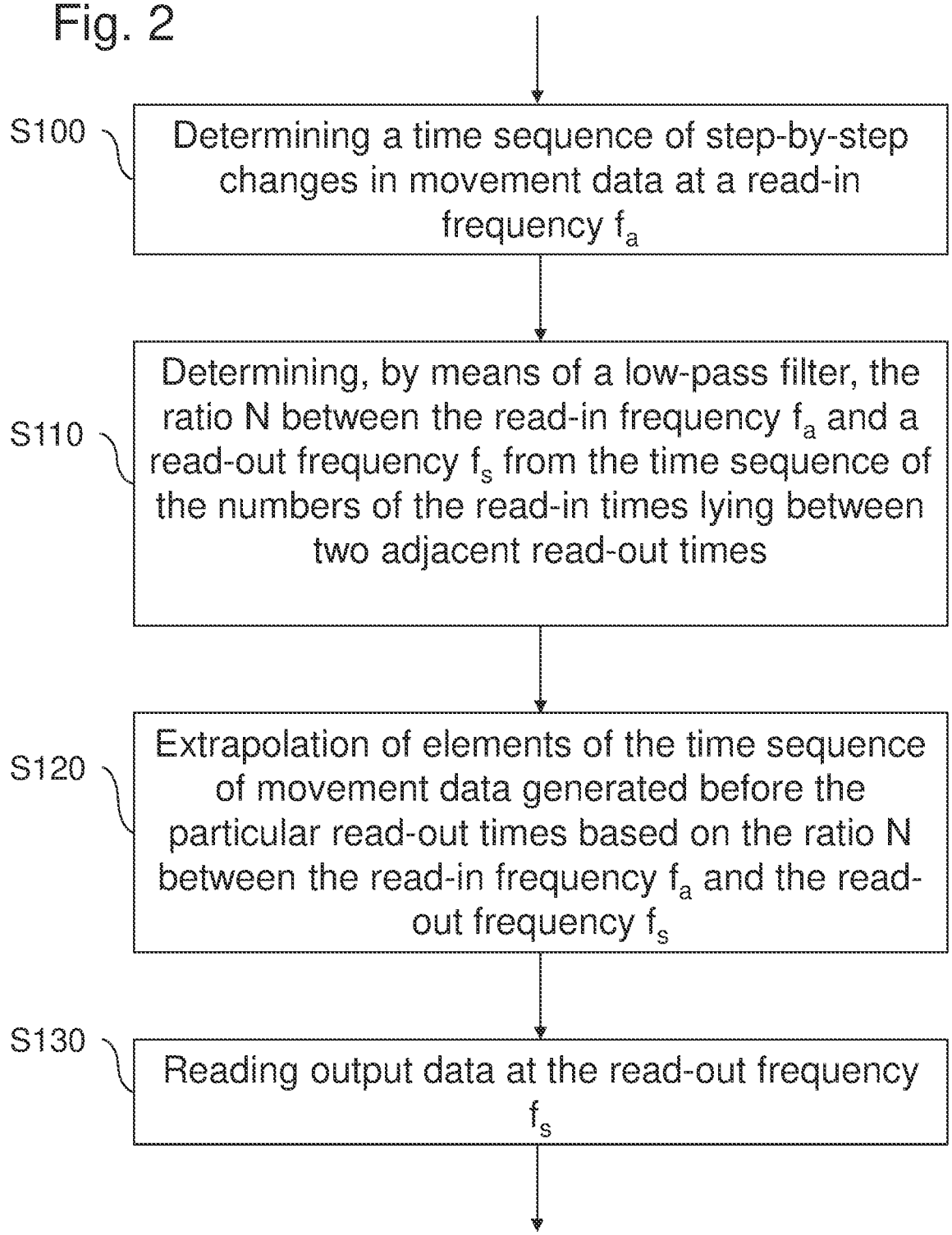
FIG. 2 shows a schematic flow diagram of a method for generating and outputting data.

A schematic flow diagram for a method for reading data from an inertial sensor is shown in FIG. 2. Although the focus is on inertial sensors in the following text, it goes without saying that the method can also be applied to any other type of sensor that outputs data values step by step that represent changes in a specific measured variable.

At S100, a time sequence of numerical measured values is determined. The successive follow-up elements differ by certain numerical values, i.e. the measured values change step by step or incrementally. The individual changes can therefore also be referred to as partial increments. This is typically the case with measured values recorded by inertial sensors; these then represent, e.g., angle increments or speed increments. However, it is also conceivable to operate other sensors in this way, e.g., temperature or pressure sensors, which only determine the change in their measured variable, but not an absolute value. The determination of the sequence of measured values necessarily also entails the determination of the individual changes, i.e. the partial increments.

As already explained above, the partial increments are generated with a data path cycle or a read-in frequency $f_a$. This means that, after each period duration $1/f_a$ of the read-in frequency, a read-in time is reached where the data sequence is updated, i.e. a partial increment is generated.

The measured data is to be ultimately read out at a read-out frequency $f_s$. The read-out frequency $f_s$ is not known to the sensor that generates the measured values or partial increments. Rather, the read-out frequency $f_s$ is specified by an external device, such as the processor of a navigation platform. As described above, the read-out frequency $f_s$ is smaller than the read-in frequency $f_a$, and the two frequencies are generally not multiples of one another. This means that read-in times and read-out times mostly diverge.

To determine the read-out frequency $f_s$, a time sequence of the number of occurrences of read-in times between two read-out times is determined at S110. It is therefore determined for each read-out cycle how many partial increments have been formed during the read-out cycle. In this process, read-in times that occur at the same time as the end of the read-out cycle are added to the ending read-out cycle.

The number of read-in times can easily be determined by the sensor, e.g., by a counter that is reset to zero with each read-out time.

As explained above, the number of read-in times fluctuates around the value N of the ratio of read-in frequency $f_a$ and read-out frequency $f_s$. This number can therefore be used as an input for a low-pass filter with which an estimate for the ratio N can be determined.

In the simplest case, the low-pass filter consists of forming an average value over a specified amount of numbers of read-in times. For example, the arithmetic mean over the last K numbers of read-in times can always be determined, with K being a natural number, e.g., 5, 10, 50, 100, 500, 1000 or more.

Preferably, however, the low-pass filter shall provide as quickly as possible an estimate for the ratio N that is as accurate as possible. In addition, the filter result shall be as constant as possible in the steady state, i.e. have the lowest possible residual ripple.

In order to achieve this, it is advantageous to use a filter algorithm the time constant of which is initially small, that is to say which leads to rapid convergence to the ultimately resulting estimated value for N at the beginning of the filtering. However, in order to prevent "overriding" the estimate, i.e. to keep the result of the filtering as constant as possible, the time constant is successively increased up to a specified maximum value.

In principle, various possibilities for realizing such a low-pass filter are conceivable. One of these shall be explained in more detail by way of example in the following text.

For this purpose, the following value is used as the estimated value $N(k)$ for the ratio N of read-in frequency $f_a$ and read-out frequency $f_s$ in a sequence of read-out cycles numbered with k:

$$N(k) = (1-2^{-q(k)}) \cdot N(k-1) + 2^{-q(k)} \cdot n(k).$$

$n(k)$ represents the number of read-in times that have occurred in the $k^{th}$ read-out cycle, and $q(k)$ is a natural number that increases with increasing k. $N(0)=n(0)$ is chosen as the initial condition.

The associated z transfer function $G_f(z)$ of such a low-pass filter is:

$$G_f(z) = \frac{2^{-q} \cdot z}{z - (1 - 2^{-q})}, \quad q \in \mathbb{N}$$

The time constant x of this low pass of the first order normalized to the filter step width or the period duration of the read-out cycle $t_A = 1/f_s$ is:

$$\frac{\tau}{t_A} = \frac{1}{\ln(1 - 2^{-q})}$$

Based on a settling time of $3 \cdot \tau$ and the use of the approximation $\ln(1-x) \approx -x$, it follows that this filter has settled after about $3/2^{-q}$ cycles.

Filtering can now be started with a lowercase q, e.g., with $q=1$. After waiting for the settling time (e.g., $3/2^{-1}=6$ cycles), the time constant is increased and again it waits until the filtering has settled. For example, by setting $q=2$, the settling time roughly doubles. In this rhythm, the time constant and the associated settling time are increased again and again from step to step until a desired final value $q_{MAX}$ is reached, e.g., $q_{MAX}$ can be 8, 10 or more.

Figure 3:
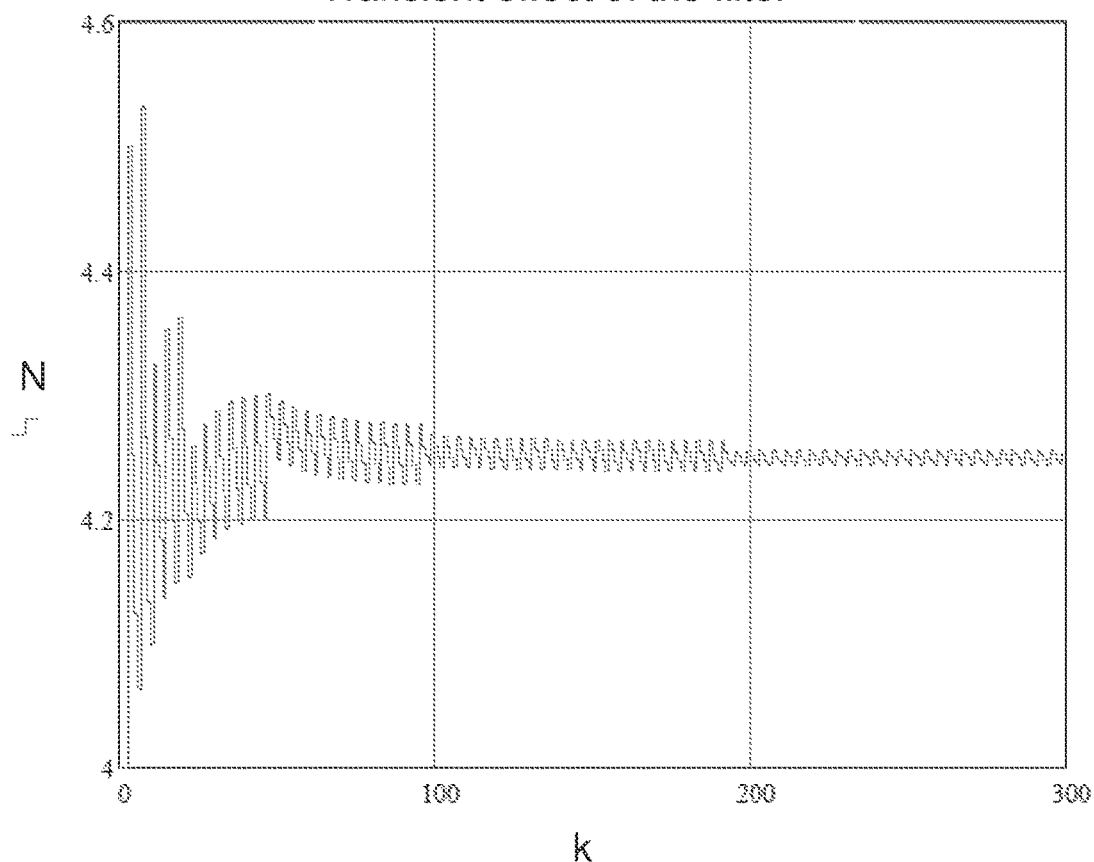
FIG. 3 shows a simulation of an estimate of the ratio of read-in frequency and read-out frequency by means of a low-pass filter.

FIG. 3 shows the beginning of the transient response of the above-described filter for a sequence of the number of data path cycles of N=4, 4, 4, 5, 4, 4, 4, 5, 4, 4, 4, 5, . . . in the first 300 cycles. As can be seen, the value $N(k)$ quickly converges to N=4.25. However, changing q prevents large fluctuations around this value.

The estimate obtained in this way for the ratio of read-in frequency $f_a$ and read-out frequency $f_s$ can then be used at S120 for the extrapolation of the read-in measured data or partial increments to the read-out times. At S130, the extrapolated output data is retrieved and read out by an external device at the read-out frequency $f_s$.

However, the direct use of this estimate N for the ratio of read-in frequency $f_a$ and read-out frequency $f_s$ in the algorithms of Example I or Example II is problematic. It is quite possible that the estimate for N determined by the low-pass filtering does not exactly match the actual frequency ratio, which is to be referred to as $N_{REF}$ in the following text. In particular, a permanently too low estimate $N < N_{REF}$ is problematic, as the following considerations show:

In the tables below, the number of "Case 1" cases for an $n_0(k)$ sequence of: $n_0=4, 4, 4, 5, 4, 4, 4, 5, 4, 4, 4, 5$, etc. and the assumption of an estimated value of N=4.2 that is too small compared to $N_{REF}=4.25$ are represented (Table 1 for Example I, Table 2 for Example II). As already explained above, a "Case 1" case occurs in Example I if $N > f_a \cdot t_{1r}(k) + n_0(k)$ applies, in Example II if $N > f_a \cdot (t_{2r}(k) + t_{1r}(k))$ applies.

TABLE 1

Calculation of "Case 1" cases for Example I

| k | $n_0(k)$ | $f_a t_{1r}(k) + n_0(k)$ | $t_{1r}(k+1)$ |
|---|---|---|---|
| 0 | 4 | 0 + 4 < 4.2 → Case 1 | 0 |
| 1 | 4 | 0 + 4 < 4.2 → Case 1 | 0 |
| 2 | 4 | 0 + 4 < 4.2 → Case 1 | 0 |
| 3 | 5 | 0 + 5 ≥ 4.2 → Case 2 | 5 + 0 − 4.2 = 0.8 |
| 4 | 4 | 0.8 + 4 ≥ 4.2 → Case 2 | 4 + 0.8 − 4.2 = 0.6 |
| 5 | 4 | 0.6 + 4 ≥ 4.2 → Case 2 | 4 + 0.6 − 4.2 = 0.4 |
| 6 | 4 | 0.4 + 4 ≥ 4.2 → Case 2 | 4 + 0.4 − 4.2 = 0.2 |
| 7 | 5 | 0.2 + 5 ≥ 4.2 → Case 2 | 5 + 0.2 − 4.2 = 1.0 |
| 8 | 4 | 1.0 + 4 ≥ 4.2 → Case 2 | 4 + 1.0 − 4.2 = 0.8 |
| 9 | 4 | 0.8 + 4 ≥ 4.2 → Case 2 | 4 + 0.8 − 4.2 = 0.6 |
| 10 | 4 | 0.6 + 4 ≥ 4.2 → Case 2 | 4 + 0.6 − 4.2 = 0.4 |
| 11 | 5 | 0.4 + 5 ≥ 4.2 → Case 2 | 5 + 0.4 − 4.2 = 1.2 |

TABLE 2

Calculation of "Case 1" cases for Example II

| k  | $n_0(k)$ | $t_{2r}(k) + t_{1r}(k)$ | | $t_{2r}(k+1)$ | $t_{1r}(k+1)$ |
|----|----|------------------------------|-----|----------------------|----------------------|
| 0  | 4  | 0 + 4.2 ≥ 4.2 | → Case 2 | 4.2 + 0 − 4.2 = 0    | 4                    |
| 1  | 4  | 0 + 4 < 4.2   | → Case 1 | 0                    | 4 − (4.2 − 0 − 4) = 3.8 |
| 2  | 4  | 0 + 3.8 < 4.2 | → Case 1 | 0                    | 4 − (4.2 − 0 − 3.8) = 3.6 |
| 3  | 5  | 0 + 3.6 < 4.2 | → Case 1 | 0                    | 5 − (4.2 − 0 − 3.6) = 4.4 |
| 4  | 4  | 0 + 4.4 ≥ 4.2 | → Case 2 | 4.4 + 0 − 4.2 = 0.2  | 4                    |
| 5  | 4  | 0.2 + 4 ≥ 4.2 | → Case 2 | 4 + 0.2 − 4.2 = 0    | 4                    |
| 6  | 4  | 0 + 4 < 4.2   | → Case 1 | 0                    | 4 − (4.2 − 0 − 4) = 3.8 |
| 7  | 5  | 0 + 3.8 < 4.2 | → Case 1 | 0                    | 5 − (4.2 − 0 − 3.8) = 4.6 |
| 8  | 4  | 0 + 4.6 ≥ 4.2 | → Case 2 | 4.6 + 0 − 4.2 = 0.4  | 4                    |
| 9  | 4  | 0.4 + 4 ≥ 4.2 | → Case 2 | 4 + 0.4 − 4.2 = 0.2  | 4                    |
| 10 | 4  | 0.2 + 4 ≥ 4.2 | → Case 2 | 4 + 0.2 − 4.2 = 0    | 4                    |
| 11 | 5  | 0 + 4 < 4.2   | → Case 1 | 0                    | 5 − (4.2 − 0 − 4) = 4.8 |
| 12 | 4  | 0 + 4.8 ≥ 4.2 | → Case 2 | 4.8 + 0 − 4.2 = 0.6  | 4                    |
| 13 | 4  | 0.6 + 4 ≥ 4.2 | → Case 2 | 4 + 0.6 − 4.2 = 0.4  | 4                    |
| 14 | 4  | 0.4 + 4 ≥ 4.2 | → Case 2 | 4 + 0.4 − 4.2 = 0.2  | 4                    |
| 15 | 5  | 0.2 + 4 ≥ 4.2 | → Case 2 | 4 + 0.2 − 4.2 = 0    | 5                    |
| 16 | 4  | 0 + 5 ≥ 4.2   | → Case 2 | 5 + 0 − 4.2 = 0.8    | 4                    |
| 17 | 4  | 0.8 + 4 ≥ 4.2 | → Case 2 | 4 + 0.8 − 4.2 = 0.6  | 4                    |
| 18 | 4  | 0.6 + 4 ≥ 4.2 | → Case 2 | 4 + 0.6 − 4.2 = 0.4  | 4                    |
| 19 | 5  | 0.4 + 4 ≥ 4.2 | → Case 2 | 4 + 0.4 − 4.2 = 0.2  | 5                    |
| 20 | 4  | 0.2 + 5 ≥ 4.2 | → Case 2 | 5 + 0.2 − 4.2 = 1.0  | 4                    |
| 21 | 4  | 1.0 + 4 ≥ 4.2 | → Case 2 | 4+ 1.0 − 4.2 = 0.8   | 4                    |
| 22 | 4  | 0.8 + 4 ≥ 4.2 | → Case 2 | 4 + 0.8 − 4.2 = 0.6  | 4                    |
| 23 | 5  | 0.6 + 4 ≥ 4.2 | → Case 2 | 4 + 0.6 − 4.2 = 0.4  | 5                    |

As can be seen in the tables, in the case of $N<N_{REF}$, no "Case 1" cases occur at all after a period of time, but only "Case 2" cases. In connection with this, the remaining portion $t_{1r}(k+1)$ in Example I that has not yet been processed and the remaining portion $t_{2r}(k+1)$ in Example II that has not yet been processed tend to keep increasing due to the missing clearing "Case 1" cases. Without corrective intervention, this effect leads to a divergence of the filter result $v(k)$.

To avoid the divergence problem described above, control of the estimated value N generated by means of low-pass filtering can be implemented to the unknown, correct $N_{REF}$. The control shall bring the value of N used for the extrapolation as closely as possible to $N_{REF}$. Then, at S120, the value of N achieved in control is used for the extrapolation.

Figure 4:
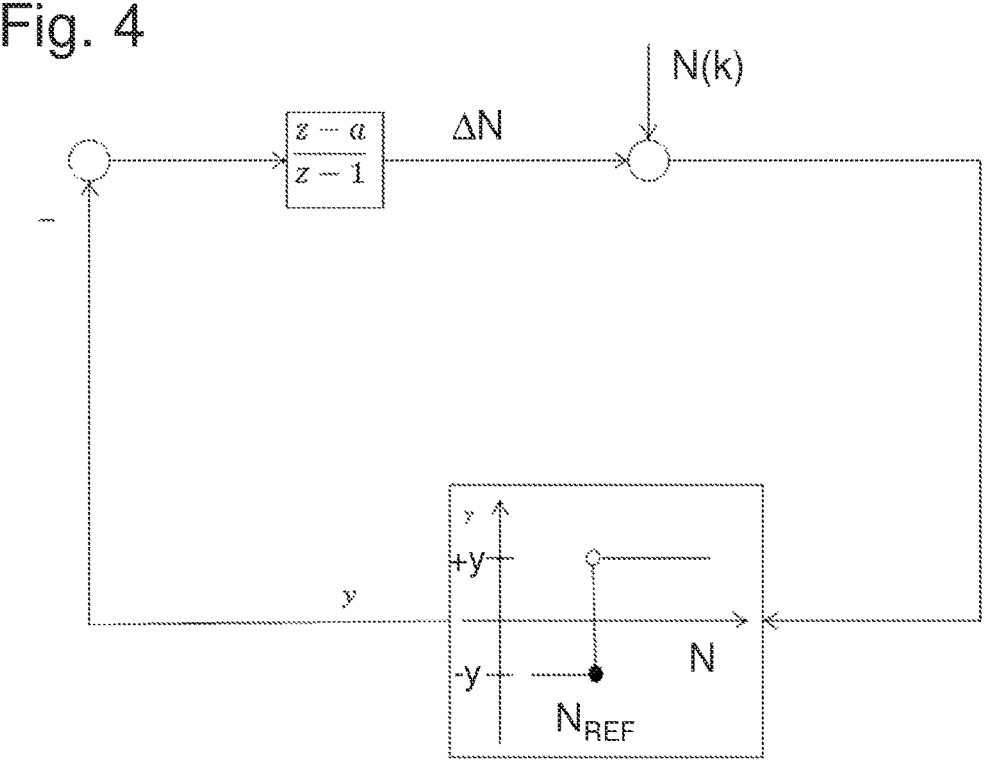
FIG. 4 shows a schematic representation of a control loop for controlling the ratio of read-in frequency and read-out frequency.

An example of a corresponding control loop is shown in FIG. 4. A reference value assumed for the ratio N, for example, the estimated value N(k) supplied by the low-pass filtering discussed above, serves as an input for the control loop.

Figure 5:
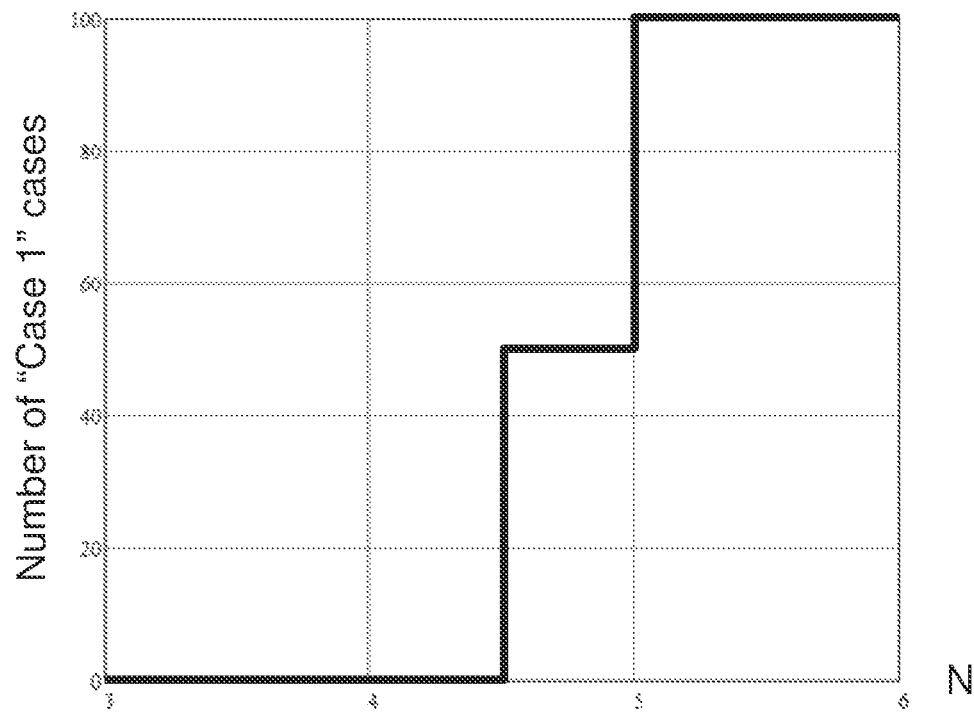
FIG. 5 shows a typical non-linear characteristic curve which has the ratio of read-in frequency and read-out frequency as an input.

The stationary model of the controlled system can be described by a jump function or non-linear characteristic curve, as, e.g., shown in FIG. 5.

This characteristic curve describes the dependence of the number of "Case 1" cases introduced in the above Examples I and II in K time increments $k_{i+1}$ to $k_{i+K}$ (i, K being natural numbers) on the assumed frequency ratio N. The characteristic curve therefore describes the number of occurring "Case 1" cases per unit of time depending on the frequency ratio N.

The appearance of this characteristic curve depends on the absolute position of $N_{REF}$ in the interval [$N_{REF}$] to [$N_{REF}$]+1 ([x]=integer portion of x). The characteristic curve in FIG. 5 is therefore to be regarded as an example only. However, it is characteristic of all characteristic curves that for $N<N_{REF}$ no "case 1" cases occur at all and that these then increase abruptly in the interval from $N_{REF}$ to [$N_{REF}$]+1 until only "Case 1" cases occur. This jumping of the characteristic curve at $N=N_{REF}$ is therefore used as a criterion for the control from N to $N_{REF}$ as follows:

If the characteristic curve yields the value 0 for the number of "Case 1" cases per unit of time, then N is too small ($N<N_{REF}$). In this case, the controller is supplied with a value −y (y>0) which, following the negation occurring in the control loop, leads to an increase in the estimated value N(k) by a correction value AN. The N corrected by AN is therefore brought closer to $N_{REF}$.

If, on the other hand, the characteristic curve delivers a value greater than 0 for the number of "Case 1" cases per unit of time, then N is too large ($N>N_{REF}$). In this case, the controller is supplied with a value +y which, after the negation occurring in the control loop, leads to a lowering of the estimated value N(k) by a correction value AN. The N corrected by AN is therefore brought closer to $N_{REF}$.

The characteristic curve does not necessarily have to be calculated or generated for this. The essential feature of the characteristic curve is the sudden behavior at $N=N_{REF}$. For $N<N_{REF}$, the characteristic curve is 0. From $N>N_{REF}$, it increases abruptly to the maximum value. Depending on the nature of the incoming number sequence $n_0(k)$, the characteristic curve can reach the maximum value either in a single jump or in several partial jumps. However, it is not decisive whether the maximum value is reached in a single jump or in several partial jumps. The decisive property of the characteristic curve is the jump or partial jump at $N=N_{REF}$. This key characteristic is used for control.

The characteristic curve does not necessarily need to be generated for this, as it is a mathematical description of the behavior of the controlled system (system model). The number of "Case 1" cases per unit of time can, e.g., be measured via a counter. From this, the controller can directly derive how it should bring N to $N_{REF}$.

Due to the fact that for $N=N_{REF}$ a "Case 1" case must always occur, it is sufficient to monitor the occurrence of these cases. When occurring for the first time, the controller can already use the value +y. If, after a "Case 1" case, "Case 1" cases are absent for the evaluation of the sequence $n_0(k)$ in the next K time increments for a time window before K time increments, the controller reverts to the value −y.

The controller itself is preferably implemented via an I or a PI element (parameter a in FIG. 4 equal to zero or not equal to zero).

In this process, a value of $N=N_{REF}$ is not reached permanently, but, as is usual for such non-linear control loops, a continuous oscillation around $N=N_{REF}$ will occur. The amplitude of this continuous oscillation can be adjusted by the amount of y. The dynamic portion of the system model, which also exists in the systems described, has been neglected in the description above. Only the non-linear characteristic curve in the steady state was taken into account. The dynamic portion can also be taken into account when selecting the controller parameters.

Thus, the use of a control loop in which the stationary system model is given by a non-linear characteristic curve or jump function in N, which jumps at $N=N_{REF}$, makes it possible to adjust the ratio N used for the extrapolation of the data read in and estimated by means of the low-pass filter to the true ratio of the read-in frequency $f_a$ and read-out frequency $f_s$, whereby the divergence problem described above can be avoided.

It is therefore possible, when using a combination of an above-described low-pass filter to find a first estimate of N, a control loop to control this estimate N to the reference value $N_{REF}$, and a filter to extrapolate the read-in measured data without knowledge of the read-out frequency $f_s$ to provide measured data at each read-out time that meet both the differential and the integral error criterion. In addition, all parameters required for this can be derived from the measured data determined by the correspondingly equipped sensor.

Figure 6:
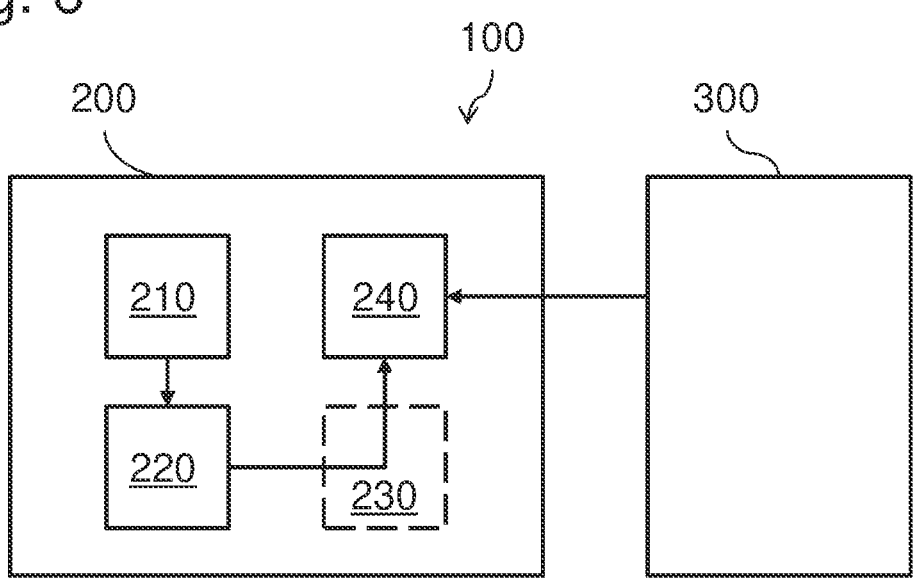
FIG. 6 shows a schematic representation of a system with a sensor.

FIG. 6 shows a schematic representation of a system 100 for implementing the method described above.

The system 100 includes a sensor 200, e.g., an inertial sensor, for determining a time sequence of measured data, e.g., movement data, at the read-in frequency $f_a$. The measured data is recorded by a sensor device 210, such as a gyro sensor or an acceleration sensor. From there, the measured data is, via a low-pass filter 220 and optionally via a control loop 230, supplied to a filter 240 which carries out the above-described extrapolation of the data read in. In this process, the low-pass filter 220, control loop 230 and filter 240 can be configured as hardware or software and can be configured either as a single component (e.g., a single processor) or as separate units.

In addition, the system 100 has an evaluation unit 300 which retrieves the measured data extrapolated in the filter 240 as output data at the read-out frequency $f_s$ and processes it further, e.g., to provide a navigation solution.

The advantages described above can be achieved with such a sensor 200 and such an evaluation unit 300. Output data can be generated which, in good approximation, reflect the state of the measured system at the read-out time, although read-out times and data recording times are different. The output data thus meets both the integral and the differential error criterion.

The invention claimed is:

1. A method for reading data from sensors, comprising:
determining a time sequence of measured data by means of a sensor, wherein the time sequence of measured data is generated by step-by-step changes in the measured data at read-in times, which are determined by a read-in frequency $f_a$ and have a time interval of a period duration $1/f_a$ of the read-in frequency;
reading output data from the sensor at read-out times, which are determined by a read-out frequency $f_s$ and have a time interval of a period duration $1/f_s$ of the read-out frequency, with the read-out frequency $f_s$ being smaller than the read-in frequency $f_a$;
determining, by means of a low-pass filter of the sensor, the ratio N between the read-in frequency $f_a$ and the read-out frequency $f_s$ from the time sequence of the numbers of read-in times lying between two adjacent read-out times; wherein
the output data to be read at the read-out times is generated in the sensor by extrapolation of elements of the time sequence of measured data generated before the particular read-out times based on the ratio N between the read-in frequency $f_a$ and the read-out frequency $f_s$.

2. The method according to claim 1, wherein
the period duration of the read-out frequency $1/f_s$ is not a multiple of the period duration of the read-in frequency $1/f_a$.

3. The method according to claim 1, wherein
the ratio N is determined by averaging the numbers of read-in times lying between two adjacent read-out times.

4. The method according to claim 1, wherein
the ratio N is determined by a filter algorithm with a variable time constant; and
the time constant becomes larger in the course of time for determining the ratio N.

5. The method according to claim 1, wherein
the ratio N in the time increment k after the start of the determination of the ratio N is given by:

$$N(k)=(1-2^{-q(k)})\cdot N(k-1)+2^{-q(k)}\cdot n(k),$$

with n(k) being the number of read-in times that have occurred in the time increment k, q(k) being a natural number and N(0)=n(0);
each time increment k has the length of a period duration of the read-out frequency $1/f_s$; and
q(k) increases with increasing k.

6. The method according to claim 1, wherein
the output data is generated according to any one of the following formulas:

Case I:

$$v(k) = v_1(k) \cdot \frac{f_a \cdot t_{1r}(k)}{n_1(k)} + v_0(k) \cdot \frac{N - f_a \cdot t_{1r}(k)}{n_0(k)} - v_r(k),$$

wherein the following applies:
initial conditions:

$$n_0(0)=n_1(0)=N;$$

$$t_{1r}(0)=v_1(0)=v_r(0)=0;$$

state transitions:

$$n_1(k+1)=n_0(k);$$

$$v_1(k+1)=v_0(k);$$

for $N>f_a \cdot t_{1r}(k)+n_0(k)$:

$$v_r(k+1)=v_0(k)/n_0(k)\cdot(N-f_a\cdot t_{1r}(k)-n_0(k));\ and$$

$$t_{1r}(k+1)=0;$$

for $N \le f_a \cdot t_{1r}(k)+n_0(k)$:

$$v_r(k+1)=0;\ and$$

$$t_{1r}(k+1)=1/f_a\cdot(n_0(k)+f_a\cdot t_{1r}(k)-N);$$

Case II:

for $N > f_a \cdot (t_{2r}(k) + t_{1r}(k))$:

$$v(k) = v_2(k) \cdot \frac{f_a \cdot t_{2r}(k)}{n_2(k)} + v_1(k) \cdot \frac{f_a \cdot t_{1r}(k)}{n_1(k)} - v_0(k) \cdot \frac{N - f_a \cdot (t_{1r}(k) + t_{2r}(k))}{n_0(k)},$$

wherein the following applies:
initial conditions:

$n_0(0) = n_1(0) = n_2(0) = f_a \cdot t_{1r}(0) = N$;

$t_{2r}(0) = v_1(0) = v_2(0) = 0$;

state transitions:

$n_1(k+1) = n_0(k)$;

$n_2(k+1) = n_1(k)$;

$v_1(k+1) = v_0(k)$;

$v_2(k+1) = v_1(k)$;

$t_{1r}(k+1) = 1/f_a \cdot (n_o(k) - N + f_a \cdot (t_{2r}(k) + t_{1r}(k)))$;

$t_{2r}(k+1) = 0$;

for $N \leq f_a \cdot (t_{2r}(k) + t_{1r}(k))$:

$$v(k) = v_2(k) \cdot \frac{f_a \cdot t_{2r}(k)}{n_2(k)} + v_1(k) \cdot \frac{N - f_a \cdot t_{2r}(k)}{n_1(k)},$$

wherein the following applies:
initial conditions:

$n_0(0) = n_1(0) = n_2(0) = f_a \cdot t_{1r} = N$;

$t_{2r}(0) = v_1(0) = v_2(0) = 0$;

state transitions:

$n_1(k+1) = n_0(k)$;

$n_2(k+1) = n_1(k)$;

$v_1(k+1) = v_0(k)$;

$v_2(k+1) = v_1(k)$;

$t_{1r}(k+1) = n_0(k)/f_a$;

$t_{2r}(k+1) = t_{2r}(k) + t_{1r}(k) - N/f_a$;

with
- $v(k)$ being the output data which are read at the $k^{th}$ read-out time;
- $n_0(k)$ being the number of read-in times positioned between the $(k-1)^{st}$ read-out time and the $k^{th}$ read-out time;
- $n_1(k)$ being the number of read-in times positioned between the $(k-2)^{nd}$ read-out time and the $(k-1)^{st}$ read-out time;
- $n_2(k)$ being the number of read-in times positioned between the $(k-3)^{rd}$ read-out time and the $(k-2)^{nd}$ read-out time;
- $v_0(k)$ being the sum of step-by-step changes in the measured data that have taken place at the read-in times that were positioned between the $(k-1)^{st}$ read-out time and the $k^{th}$ read-out time;
- $v_1(k)$ being the sum of step-by-step changes in the measured data that have taken place at the read-in times that were positioned between the $(k-2)^{nd}$ read-out time and the $(k-1)^{st}$ read-out time;
- $v_2(k)$ being the sum of step-by-step changes in the measured data that have taken place at the read-in times that were positioned between the $(k-3)^{rd}$ read-out time and the $(k-2)^{nd}$ read-out time;
- $t_{1r}$ and $t_{2r}$ being time intervals; and
- $v_r$ being a residual term.

7. The method according to claim 1, wherein,
for the extrapolation of the elements of the time sequence of measured data generated before the particular read-out times, the ratio N determined by means of the low-pass filter in the sensor is controlled to the actual ratio $N_{REF}$ of the read-in frequency $f_a$ and readout frequency $f_s$ in a control loop; and
the particular result of the control to the actual ratio $N_{REF}$ is used for the extrapolation.

8. The method according to claim 7, wherein
the control is an I or a PI control;
the control is based on a jump function in N, which jumps from zero to a value greater than zero at a value of $N = N_{REF}$; and
in the control, a given positive value y is fed back negatively if the jump function is greater than zero when the actual value of N is present, and the negative given value −y is fed back negatively if the jump function is equal to or less than zero when the actual value of N is present.

9. The method of claim 8, wherein in case I, the jump function is derived from the number of occurrences of the case $N > f_a \cdot t_{1r}(k) + n_0(k)$ in K time increments $k_{i+1}$ to $k_{i+K}$, with i and K being natural numbers; and
the output data is generated according to the following formula:

$$v(k) = v_1(k) \cdot \frac{f_a \cdot t_{1r}(k)}{n_1(k)} + v_0(k) \cdot \frac{N - f_a \cdot t_{1r}(k)}{n_0(k)} - v_r(k), \quad \text{Case I}$$

wherein the following applies:
initial conditions:

$n_0(0) = n_1(0) = N$;

$t_{1r}(0) = v_1(0) = v_r(0) = 0$;

state transitions:

$n_1(k+1) = n_0(k)$;

$v_1(k+1) = v_0(k)$;

for $N \geq f_a \cdot t_{1r}(k) + n_0(k)$:

$v_r(k+1) = v_0(k)/n_0(k) \cdot (N - f_a \cdot t_{1r}(k) - n_0(k))$; and $t_{1r}(k+1) = 0$;

for $N \leq f_a \cdot t_{1r}(k) + n_0(k)$:

$v_r(k+1) = 0$; and $t_{1r}(k+1) = 1/f_a \cdot (n_0(k) + f_a \cdot t_{1r}(k) - N)$; and in case II, the jump function is derived from the number of occurrences of the case $N > f_a \cdot (t_{2r}(k) + t_{1r}(k))$ in K time increments $k_{i+1}$ to $k_{i+K}$, with i and K being natural numbers, and;
the output data is generated according to the following formula:

for $N > f_a \cdot (t_{2r}(k) + t_{1r}(k)) : v(k) =$ Case II $$v_2(k) \cdot \frac{f_a \cdot t_{2r}(k)}{n_2(k)} + v_1(k) \cdot \frac{f_a \cdot t_{1r}(k)}{n_1(k)} + v_0(k) \cdot \frac{N - f_a \cdot (t_{1r}(k) + t_{2r}(k))}{n_0(k)},$$

wherein the following applies:
initial conditions:

$n_0(0) = n_1(0) = n_2(0) = f_a \cdot t_{1r}(0) = N;$ $t_{2r}(0) = v_1(0) = v_2(0) = 0;$ state transitions:

$n_1(k+1) = n_0(k);$ $n_2(k+1) = n_1(k);$ $v_1(k+1) = v_0(k);$ $v_2(k+1) = v_1(k);$ $t_{1r}(k+1) = 1/f_a(n_o(k) - N + f_a \cdot (t_{2r}(k) + t_{1r}(k)));$ $t_{2r}(k+1) = 0;$ for $N \leq f_a(t_{2r}(k) + t_{1r}(k)):$ $$v(k) = v_2(k) \cdot \frac{f_a \cdot t_{2r}(k)}{n_2(k)} + v_1(k) \cdot \frac{N - f_a \cdot t_{2r}(k)}{n_1(k)},$$

wherein the following applies:
initial conditions:

$n_0(0) = n_1(0) = n_2(0) = f_a \cdot t_{1r} = N;$ $t_{2r}(0) = v_1(0) = v_2(0) = 0;$ state transitions:

$n_1(k+1) = n_0(k);$ $n_2(k+1) = n_1(k);$ $v_1(k+1) = v_0(k);$ $v_2(k+1) = v_1(k);$ $t_{1r}(k+1) = n_0(k)/f_a;$ $t_{2r}(k+1) = t_{2r}(k) + t_{1r}(k) - N/f_a;$ with
v(k) being the output data which are read at the $k^{th}$ read-out time;

$n_0(k)$ being the number of read-in times positioned between the $(k-1)^{st}$ read-out time and the $k^{th}$ read-out time;

$n_1(k)$ being the number of read-in times positioned between the $(k-2)^{nd}$ read-out time and the $(k-1)^{st}$ read-out time;

$n_2(k)$ being the number of read-in times positioned between the $(k-3)^{rd}$ read-out time and the $(k-2)^{nd}$ read-out time;

$v_0(k)$ being the sum of step-by-step changes in the measured data that have taken place at the read-in times that were positioned between the $(k-1)^{st}$ read-out time and the $k^{th}$ read-out time;

$v_1(k)$ being the sum of step-by-step changes in the measured data that have taken place at the read-in times that were positioned between the $(k-2)^{nd}$ read-out time and the $(k-1)^{st}$ read-out time;

$v_2(k)$ being the sum of step-by-step changes in the measured data that have taken place at the read-in times that were positioned between the $(k-3)^{rd}$ read-out time and the $(k-2)^{nd}$ read-out time;

$t_{1r}$ and $t_{2r}$ being time intervals; and $v_r$ being a residual term.

10. A sensor for measuring measured data, comprising:
a sensor device which is suitable for determining a time sequence of measured data, with the time sequence of measured data being generated by step-by-step changes in the measured data at read-in times which are determined by a read-in frequency $f_a$ and a time interval of a period duration $1/f_a$ of the read-in frequency;
a filter which is suitable, upon request from an external device, to output output data at read-out times which is determined by a read-out frequency $f_s$ and have a time interval of a period duration $1/f_s$ of the read-out frequency, with the read-out frequency $f_s$ being less than the read-in frequency $f_a$;
a low-pass filter for determining the ratio N between the read-in frequency $f_a$ and the read-out frequency $f_s$ from the time sequence of the numbers of read-in times lying between two adjacent read-out times; wherein
the output data to be output at the read-out times is generated in the filter by extrapolation of elements of the time sequence of measured data generated before the particular read-out times based on the ratio N between the read-in frequency $f_a$ and the read-out frequency $f_s$.

11. An inertial navigation system, comprising:
the sensor according to claim 10; and
an evaluation unit which is suitable for requesting the output data at the read-out frequency $f_s$ and calculating a navigation solution from this.

\* \* \* \* \*